United States Patent
Sharma

(10) Patent No.: US 12,521,115 B2
(45) Date of Patent: Jan. 13, 2026

(54) REPOSITIONABLE CLIP WITH SYMMETRIC OPEN FORCE

(71) Applicant: BOSTON SCIENTIFIC MEDICAL DEVICE LIMITED, Galway (IE)

(72) Inventor: Deepak Kumar Sharma, Muzaffarnagar (IN)

(73) Assignee: Boston Scientific Medical Device Limited, Galway (IE)

( * ) Notice: Subject to any disclaimer, the term of this patent is extended or adjusted under 35 U.S.C. 154(b) by 77 days.

(21) Appl. No.: 18/672,710

(22) Filed: May 23, 2024

(65) Prior Publication Data

US 2024/0415511 A1    Dec. 19, 2024

Related U.S. Application Data

(60) Provisional application No. 63/508,372, filed on Jun. 15, 2023.

(51) Int. Cl.
*A61B 17/10* (2006.01)
*A61B 17/08* (2006.01)
*A61B 17/00* (2006.01)

(52) U.S. Cl.
CPC ............ *A61B 17/10* (2013.01); *A61B 17/083* (2013.01); *A61B 2017/00296* (2013.01); *A61B 2017/00818* (2013.01)

(58) Field of Classification Search
CPC ....... A61B 17/083; A61B 17/10; A61B 17/12; A61B 17/122; A61B 17/128; A61B 17/1285; A61B 2017/00296; A61B 2017/00818

See application file for complete search history.

(56) References Cited

U.S. PATENT DOCUMENTS

| | | | |
|---|---|---|---|
| 8,685,043 B2* | 4/2014 | Jugenheimer | A61B 17/10 606/142 |
| 11,013,518 B2* | 5/2021 | Zhong | A61B 17/083 |
| 11,779,344 B2* | 10/2023 | Smith | A61B 17/122 606/142 |
| 12,178,445 B2* | 12/2024 | Smith | A61B 17/1285 |
| 12,232,697 B2* | 2/2025 | Adhikarath Balan | A61B 1/00137 |
| 12,310,596 B2* | 5/2025 | Adhikarath Balan | A61B 17/10 |
| 12,390,224 B2* | 8/2025 | Sharma | A61B 17/122 |
| 12,396,735 B2* | 8/2025 | Singh | A61B 17/083 |
| 2002/0032454 A1* | 3/2002 | Durgin | A61B 17/1227 606/151 |

(Continued)

*Primary Examiner* — Ryan J. Severson
(74) *Attorney, Agent, or Firm* — Fay Kaplun & Marcin, LLP

(57) ABSTRACT

A clipping system includes an adapter and a clip. The proximal portion of the adapter extends along a first longitudinal axis. The distal portion of the adapter includes a cylinder extending along a second longitudinal axis that extends substantially perpendicular relative to the first axis. The clip includes first and second pairs of arms and first and second jaws. Proximal ends of the first arms are connected via a first hinge. Proximal ends of the second arms are connected via a second hinge. The first jaw extends between distal ends of a first one of the first arms and a first one of the second arms. The second jaw extends between distal ends of a second one of the first arms and a second one of the second arms so that the jaws are movable relative to one another between open and closed configurations.

20 Claims, 5 Drawing Sheets

(56) References Cited

U.S. PATENT DOCUMENTS

| | | | |
|---|---|---|---|
| 2002/0062130 A1* | 5/2002 | Jugenheimer | A61B 17/1285 606/142 |
| 2014/0228864 A1* | 8/2014 | Jugenheimer | A61B 17/122 606/157 |
| 2019/0254672 A1 | 8/2019 | Williamson, IV et al. | |
| 2022/0096090 A1 | 3/2022 | Smith et al. | |
| 2022/0378433 A1* | 12/2022 | Smith | A61B 17/10 |
| 2023/0027249 A1* | 1/2023 | Adhikarath Balan | A61B 17/1285 |
| 2023/0055904 A1* | 2/2023 | Adhikarath Balan | A61B 17/083 |
| 2023/0157699 A1 | 5/2023 | Smith et al. | |
| 2023/0181195 A1* | 6/2023 | Singh | A61B 17/083 606/142 |
| 2023/0225740 A1* | 7/2023 | Sharma | A61B 17/10 606/142 |
| 2023/0404594 A1* | 12/2023 | Sharma | A61B 17/1227 |
| 2024/0415511 A1* | 12/2024 | Sharma | A61B 17/10 |
| 2025/0072903 A1* | 3/2025 | Smith | A61B 17/122 |
| 2025/0160625 A1* | 5/2025 | Adhikarath Balan | A61B 17/1227 |
| 2025/0255613 A1* | 8/2025 | Adhikarath Balan | A61B 1/00133 |

* cited by examiner

REPOSITIONABLE CLIP WITH SYMMETRIC OPEN FORCE

PRIORITY CLAIM

The present disclosure claims priority to U.S. Provisional Patent Application Ser. No. 63/508,372 filed Jun. 15, 2023; the disclosure of which is incorporated herewith by reference.

FIELD

The present disclosure relates to endoscopic devices and, in particular, relates to endoscopic clipping devices for treating tissue, for example, along the gastrointestinal tract.

BACKGROUND

Physicians have become more willing to perform aggressive interventional and therapeutic endoscopic gastrointestinal (GI) procedures, which may increase the risk of perforating the wall of the GI tract or may require closure an opening in the GI tract wall as part of the procedure. Such procedures may include, for example, the removal of large lesions, tunneling under the mucosal layer of the GI tract to treat issues below the mucosa, full thickness removal of tissue, treatment of organs outside of the GI tract using instruments inserted through the GI tract and which are passed out of the GI tract through an opening created in the GI tract wall, and endoscopic treatment/repair of post-surgical issues (e.g., post-surgical leaks, breakdown of surgical staple lines, and anastomotic leaks).

Currently, tissue may be treated via endoscopic closure devices including through—the scope clips or over-the-scope clips. Over-the-scope clips may be particularly useful for achieving closure of larger tissue defects. In some cases, however, current endoscopic closure devices may be difficult to use, time consuming to position, or insufficient for certain perforations, conditions, and anatomies. For example, current over-the-scope clips are generally deployed from a position in which the clip itself is not visible to the operator. That is, prior to clipping the operator may view the target tissue to be clipped and, based on this visualization of the target tissue may determine that the distal end of the device and the clip are in a desired position relative to the target tissue. Based on the observation of the target tissue, the operator then deploys the clip without being able to see the clip itself until it is deployed. Once deployed, such current over-the scope clips are generally incapable of being repositioned.

SUMMARY

The present disclosure relates to a clipping system for treating tissue. The system includes an adapter and a clip. The adapter includes a proximal portion and a distal portion. The proximal portion extends along a first longitudinal axis and configured to be mounted over a distal end of an insertion device so that the first longitudinal axis is in alignment with a longitudinal axis of the insertion device. The distal portion includes a longitudinally truncated cylinder extending along a second longitudinal axis that extends substantially perpendicular relative to the first longitudinal axis.

The clip includes a first pair of arms, proximal ends of which are connected to one another via a first hinge. The clip also includes a second pair of arms, proximal ends of which are connected to one another via a second hinge. In addition, the clip includes first and second jaws. The first jaw extends between distal ends of a first one of the first pair of arms and a first one of the second pair of arms. The second jaw extends between distal ends of a second one of the first pair of arms and a second one of the second pair of arms so that the first and second jaws are movable relative to one another between an open configuration, in which the first and second jaws are mounted over the distal portion of the adapter such that the first and second jaws separated from one another, and a closed configuration, in which the first and second jaws are moved off of the adapter so that the first and second jaws are moved toward one another.

In an embodiment, each of the first and second pairs of arms are formed of a single piece of material bent so that the first and second pairs of arms form an open ring shape with the first and second hinges at proximal ends thereof, the first and second hinges biasing the clip toward the closed configuration.

In an embodiment, each of the first and second hinges are connected to the proximal ends of a corresponding one of the first and second pairs of arms via a waisted portion formed via inwardly bent portions of the single piece of material.

In an embodiment, each of the first and second hinges includes a yoke received therein, the yoke configured to releasably engage a pull wire for moving the clip between the open configuration and the closed configuration.

In an embodiment, each of the yokes include includes a proximal portion including a cavity configured to releasably receive an enlarged end of the pull wire, a proximal opening of the cavity configured to deform when subject to a force exceeding a predetermined threshold force to allow the enlarged end of the pull wire to be released therefrom.

In an embodiment, the proximal opening includes at least one slit extending thereabout, the at least one slit configured to break and increase a size of the proximal opening when subject to a force exceeding the predetermined threshold force to allow the enlarged end of the pull wire to be released therefrom.

In an embodiment, each of the yokes includes a flared distal portion sized, shaped, and configured to interface with the proximal ends of a corresponding one of the first and second pairs of arms to aid in moving the clip from the closed configuration toward the open configuration so as to reduce a stress on the first and second hinges.

In an embodiment, a proximal end of the proximal portion of the adapter includes a flange with a pair of openings extending therethrough, the pair of openings in alignment with planar ends of the truncated cylinder of the distal portion and configured to slidably receive pull wires therethrough so that the first and second pairs of arms slide along the planar ends to move the clip relative to adapter between the open and closed configurations.

In addition, the present disclosure relates to a clipping system for treating tissue. The system includes an endoscope, an adapter, a clip and first and second pull wires. The endoscope includes a shaft extending longitudinally from a proximal end to a distal end. The adapter includes a proximal portion mounted over the distal end of the shaft such that a first longitudinal axis along which the proximal portion extends is coaxially aligned with a longitudinal axis of the shaft, and a distal portion including a longitudinally truncated cylinder extending along a second longitudinal axis substantially perpendicular to the first longitudinal axis, a channel extending through the proximal and distal portions along the first longitudinal axis.

The clip includes a first pair of arms, proximal ends of which are connected to one another via a first hinge. The clip also includes a second pair of arms, proximal ends of which are connected to one another via a second hinge. In addition, the clip includes first and second jaws. The first jaw extends between distal ends of a first one of the first pair of arms and a first one of the second pair of arms. The second jaw extends between distal ends of a second one of the first pair of arms and a second one of the second pair of arms so that the first and second jaws are movable relative to one another between an open configuration, in which the first and second jaws are mounted over the distal portion of the adapter such that the first and second jaws separated from one another, and a closed configuration, in which the first and second jaws are moved off of the adapter so that the first and second jaws are moved toward one another.

The first and second pull wires connected to the first and second hinges, respectively, via yokes received within the first and second hinges. The first and second pull wires are releasably coupled to the yokes and longitudinally slidable relative to the endoscope to move the clip between the open configuration, an initial deployed configuration, in which the clip is in the closed configuration immediately distal of the adapter, and a review configuration, in which the clip is moved distally away from the distal end of the endoscope while remaining tethered to the endoscope via the first and second pull wires.

In an embodiment, each of the first and second pairs of arms are formed of a single piece of material bent so that the first and second pairs of arms form an open ring shape with the first and second hinges at proximal ends thereof, the first and second hinges biasing the clip toward the closed configuration.

In an embodiment, each of the first and second hinges are connected to the proximal ends of a corresponding one of the first and second pairs of arms via a waisted portion formed via inwardly bent portions of the single piece of material.

In an embodiment, each of the yokes includes a proximal portion sized and shaped to be received within a corresponding one of the first and second hinges and a distal portion that is sized, shaped, and configured to interface with proximal ends of a corresponding one of the first and second pairs of arms.

In an embodiment, the distal portions of the yokes are flared so that, when the yokes are moved proximally relative to the clip, the flared distal portions slide proximally along the proximal ends of the first and second pairs of arms to facilitate movement of the clip from the closed configuration toward the open configuration.

In an embodiment, each of the first and second pull wires include an enlarged distal end releasably received within a correspondingly sized and shaped cavity within the proximal portion of a corresponding one of the yokes, a proximal opening of the cavity configured to deform to permit a proximal passage of the enlarged distal end therethrough when subject to a force exceeding a predetermined threshold force.

In an embodiment, the system further includes first and second tubular deployment members configured to slidably receive the first and second pull wires therein. Each of the first and second tubular deployment members is longitudinally movable relative to the endoscope so that, during a final deployment of the clip, distal ends of the first and second tubular deployment members are positionable against the first and second hinges, respectively, to hold the clip in place as the first and second pull wires are drawn proximally relative thereto to exert the predetermined threshold force on the yokes.

In addition, the present disclosure relates to a method for treating tissue. The method includes inserting a clip to a target area in a body lumen via an endoscope, the clip mounted over a distal end of an endoscopic shaft, via an adapter, in an open insertion configuration in which first and second jaws of the clip extend over curved surfaces of a distal portion of the adapter so that that the first and second jaws are separated from one another, the adapter including a proximal portion mounted over the distal end of the shaft such that a first longitudinal axis along which the proximal portion extends is coaxially aligned with a longitudinal axis of the shaft, the distal portion including a longitudinally truncated cylinder extending along a second longitudinal axis substantially perpendicular to the first longitudinal axis; applying a suction force through a working channel of the endoscope so that tissue is drawn into a channel of the adapter, which extends along the first longitudinal axis, and between the first and second jaws of the clip; and moving the clip from the open insertion configuration to an initial deployed configuration by releasing a tension along pull wires that are releasably coupled to the clip, the clip including a first pair of arms, proximal ends of which are connected to one another via a first hinge, and a second pair of arms, proximal ends of which are connected to one another via a second hinge, the first jaw extending between distal ends of a first one of the first pair of arms and a first one of the second pair of arms, while the second jaw extends between distal ends of a second one of the first pair of arms and a second one of the second pair of arms so that the first and second jaws are movable relative to one another between the open insertion configuration and the initial deployed configuration in which the clip is moved distally off of the distal portion of the adapter so that the first and second jaws revert toward a biased closed configuration to grip tissue therebetween.

In an embodiment, the method further includes moving the clip toward a review configuration in which the endoscope is drawn proximally away from the clip to widen a field of vision of the clip via a vision system of the endoscope, while the clip remains tethered to the endoscope via the pull wires.

In an embodiment, the pull wires are connected to the first and second hinges, respectively, via yokes received within the first and second hinges, the pull wires releasably coupled to the yokes and longitudinally slidable relative to the endoscope to move the clip between the open insertion configuration, the initial deployed configuration, and the review configuration.

In an embodiment, when it is determined that the clip requires repositioning, moving the endoscope distally relative to the clip and drawing the pull wires proximally relative to the endoscope so that the flared distal portions of the yoke interface with proximal ends of the first and second pairs of arms to aid in moving the clip from the biased closed configuration toward the open insertion configuration as the clip is draw proximally over the distal portion of the adapter to reduce a stress on the first and second hinges.

In an embodiment, the method further includes finally deploying a closed clip by sliding tubular deployment members distally over the pull wires until distal ends of the tubular deployment members are positioned against the first and second hinges to hold the clip in place as the pull wires are drawn proximally relative thereto to exert a predetermined threshold force on the yokes, causing the pull wires to be disengaged from the yokes and the clip.

BRIEF DESCRIPTION

DETAILED DESCRIPTION

Figure 1:
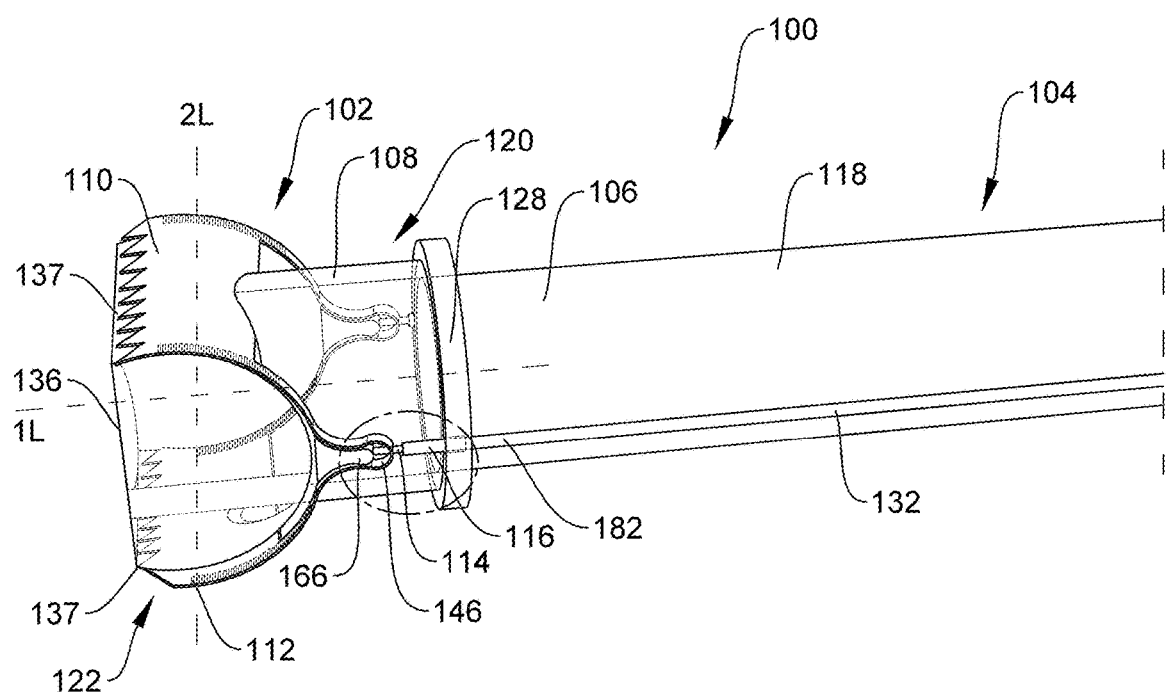
FIG. 1 shows a perspective view of a distal portion of clipping system according to an exemplary embodiment of the present disclosure, with a clip thereof in an open insertion configuration.

The present disclosure may be further understood with reference to the following description and the appended drawings, wherein like elements are referred to with the same reference numerals. The present disclosure relates to a clipping system and, in particular, relates to an over-the-scope endoscopic clipping system, in which an initial placement of a clip may be viewed and adjusted prior to a final deployment thereof. Exemplary embodiments of the present disclosure comprise a clip configured to be mounted over a distal end of a scope device via an adapter and releasably coupled to first and second pull wires so that the clip may be moved between an insertion position, an initial deployed position, and a review position in which the clip can be viewed prior to being finally deployed.

In an exemplary embodiment, the clip includes a first pair of arms, proximal ends of which are connected to one another via a first hinge, and a second pair of arms, proximal ends of which are connected to one another via a second hinge. A first jaw extends between distal ends of a first one of the first pair of arms and a first one of the second pair of arms, while a second jaw extends between distal ends of a second one of the first pair of arms and a second one of the second pair of arms so that the first and second jaws are movable relative to one another between an open configuration, in which the first and second jaws are separated from one another to receive a tissue therebetween, and a closed configuration, in which the first and second jaws are moved toward one another to grip tissue. The first pull wire is connected to the first hinge via a first yoke while the second pull wire is connected to the second hinges via a second yoke, the first and second yokes configured to reduce a stress on the first and second hinges as the clip is moved between the open and the closed configurations.

When positioned for insertion into the body, the clip is mounted over the adapter in an open configuration with first and second jaws of the clip separated from one another so that the clip is ready to receive tissue between the first and second jaws. The insertion position is configured to facilitate insertion of the scope device to a target site adjacent to tissue to be clipped (e.g., along a tortuous path through a body lumen). Once the clip has been inserted to the target site tissue may be drawn into the adapter (e.g., under suction or a grasper applied via a working channel of the endoscope) so that tissue is received between the first and second jaws. The clip may then be moved distally over the adapter so that the first and second jaws move toward one another (the closed configuration) gripping tissue in an initial deployed configuration. The system then permits the scope device to be withdrawn proximally away from the clip to a review configuration while the clip remains coupled to the scope device via the pull wires.

As the scope device is withdrawn proximally while the clip remains clipped over the tissue, the field of view of the vision system of the scope device widens to show the clip and the tissue clipped thereby so that the operator can determine whether the position of the clip relative to the target tissue is desirable or in need of adjustment. If the operator determines that the clip is positioned as desired, the clip is finally deployed and left in place clipped over the target tissue. If the operator determines that the position of the clip needs adjustment, the scope device is moved distally to a position adjacent to the clip. The clip is then drawn proximally over the adapter to reopen the clip by drawing the clip proximally over the distal end of the adapter forcing the clip to open against its natural bias as the clip slides proximally back over the adapter to return to release from the tissue and return to the insertion configuration.

After the clip has been removed from the tissue and returned to the insertion configuration, the operator re-positions the distal end of the scope device, as desired, draws a new target portion of tissue into the adapter and once more moves the clip distally off of the adapter so that returns to the initial deployed position and closes over the new portion of target tissue. The scope device is then withdrawn proximally to the review position as the clip remains coupled to the scope device. The position of the clip and the clipped tissue are again observed and, this process may be repeated until the clip is positioned as desired. When the operator sees that the tissue over which the clip is closed is the desired portion of tissue, the clip may be fully deployed and released from the scope device as described below. It will be understood by those of skill in the art that terms proximal and distal, as used herein, are intended to refer to a direction toward (proximal) and away from (distal), respectively, a user of the device.

As shown in FIGS. 1-10, a clipping system 100 for treating tissue defects and/or perforations according to an exemplary embodiment comprises a clip 102 configured to be mounted over a distal end 106 of a scope device 104 via an adapter 108 that is removably coupled to the distal end 106 of the scope device 104. The clip 102 is movable relative to the adapter 108 between an insertion position, in which the clip 102 is mounted over the adapter 108 in an open configuration with first and second jaws 110, 112 separated from one another to receive tissue therebetween, and an initial deployed position, in which the clip is moved distally relative to the adapter 108 so that the first and second jaws 110, 112 close to grip tissue therebetween.

The clip 102 is releasably coupled to a pair of pull wires 114 via yokes 166 received within first and second hinges 146, 152 of the clip 102 to reduce stress on the first and second hinges 146, 152 during movement of the clip 102 between the open and closed positions. The pull wires 114 also allow the scope device 104 to be drawn proximally away from the closed clip 102 to a review position, while the clip 102 remains tethered to the scope device 104. In the review position, the field of view of the scope vision system is widened to allow a user (e.g., surgeon) of the system 100 to view and confirm whether the clip 102 has been clipped over target tissue, as desired.

As will be described in further detail below, if the user determines that the position of the clip 102 relative to the target tissue is incorrect or suboptimal, the user may move the scope device 104 distally relative to the clip 102 and retract the clip 102 proximally over the adapter 108 to reopen the clip 102 (separating the first and second jaws 110, 112) and release the clip 102 from the previously clipped tissue. The user then repositions the clip 102 relative to the target tissue and draws a new portion of tissue into the adapter 108. The user then moves the clip 102 distally over and off of the adapter 108 to return the clip 102 to the initial deployed position clipped over this new portion of tissue and then withdraws the scope device 104 proximally away from the clip 102 to the review position, repeating these steps until the target tissue has been clipped as desired. When the user confirms that the clip 102 is clipped over target tissue as desired, the clip is finally deployed and the clip 102 is separated from the rest of the clipping system 100.

Figure 2:
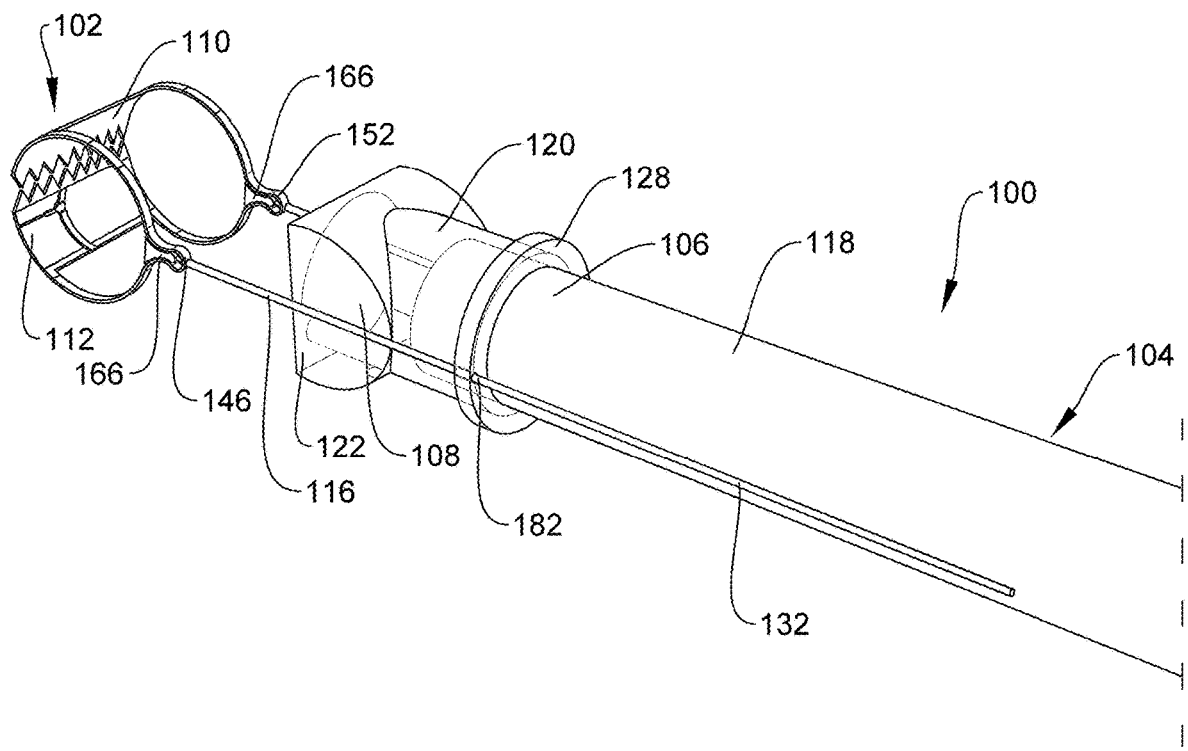
FIG. 2 shows a perspective view of the distal portion of the clipping system of FIG. 1, with the clip thereof in a review position.

As shown in FIGS. 1-2, the clip 102 may be mounted to the distal end of any standard scope device 104, such as an endoscope, via the adapter 108, which is sized, shaped and configured to mounted over the distal end 106 of a shaft 118 (e.g., an endoscopic shaft) of the scope device 104. As will be understood by those of skill in the art, the shaft 118 of the scope device 104 is configured to be inserted through a body lumen to a target site within the lumen and thus, should be sufficiently flexible to navigate through even tortuous paths of the body lumen. As will be understood by those of skill in the art, however, the adapter 108 may be sized and shaped to be mounted over the distal end of any insertion device (flexible or rigid) suitable for accessing a target site within a body at which tissue to be clipped is located. A proximal end 186 of the shaft 118 in this embodiment is connected to a handle member 190 of a user interface 188 which, as will be described in further detail below, may be used via a physician or other user, to guide the flexible endoscope through, for example, a bodily lumen (e.g., gastrointestinal tract) to a target site adjacent to target tissue to be clipped. The user interface 188 also facilitates movement of the clip 102 between the insertion, initial deployed, review, and final deployed positions.

Figure 3:
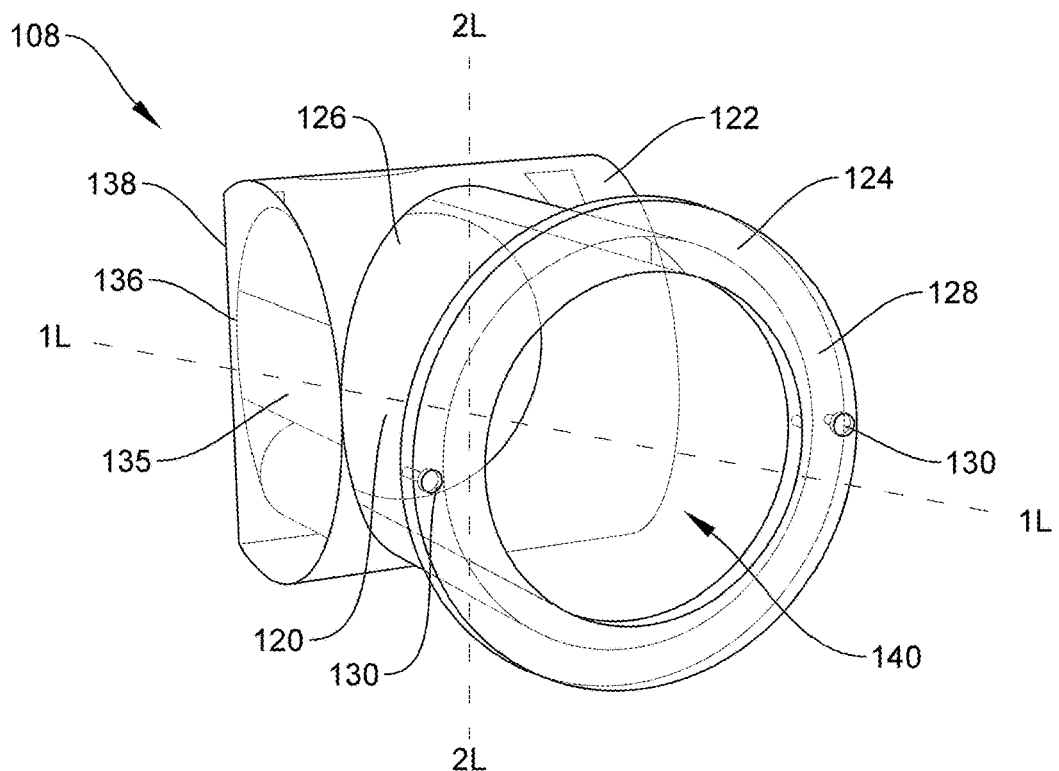
FIG. 3 shows a perspective view of an adapter according to the exemplary clipping system of FIG. 1.

The adapter 108, as shown in FIGS. 1-3, includes a proximal portion 120 configured to be mounted over the distal end 106 of the shaft 118 and a distal portion 122 configured to receive the clip 102 thereover, in the open insertion configuration. The proximal portion 120 may be substantially tubular, extending from a proximal end 124 to a distal end 126, and may be configured to be mounted over the distal end 106 of the scope device 104 via, e.g., a friction fit. A longitudinal axis 1L of the proximal portion 120 configured to be aligned with a longitudinal axis of the shaft 118 when the adapter 108 is mounted thereover. The proximal end 124 of proximal portion 120 includes a flange 128 with a pair of openings 130 extending therethrough. As will be described in greater detail below, each of the pair of openings 130 is configured to be connected to a corresponding one of a pair of outer sheaths 132 or coils through which the pull wires 114 and tubular deployment members 116 may be received. In an exemplary embodiment, the openings 130 extend through diametrically opposing portions of the flange 128.

In an exemplary embodiment, the distal portion 122 of the adapter 108 is configured as a right cylinder 134 (e.g., having end surfaces 135 that extend substantially perpendicular to a longitudinal axis 2L thereof) and having a longitudinal truncation 136 (i.e., a truncation extending along a length of the cylinder 134 substantially parallel to the longitudinal axis 2L thereof). The longitudinal axis 2L of the cylinder 134 extends substantially perpendicular to the longitudinal axis 1L of the proximal portion 120 so that the longitudinal truncation is at a distal end 138 of the distal portion 122. A channel 140 extends through both the proximal and distal portions 120, 122 of the adapter 108 so that tissue may be drawn thereinto via, for example, a tissue grasper and/or suction force passed or exerted through a working channel of the shaft 118. In an exemplary embodiment, the longitudinal truncation 136 extends through the cylinder 134 at a point distally beyond a diameter of the cylinder 134 so that a width of the longitudinal truncation 136 (e.g., a distance between longitudinal edges 137 of the longitudinal truncation 136) is smaller than the diameter of the cylinder 134.

In an exemplary embodiment, the openings 130 extending through the flange 128 are aligned with the end surfaces 135 of the distal portion 122 of the adapter 108 so that, as will be described in further detail below, first and second pairs of arms 142, 148 extend along the end surfaces 135. In an exemplary embodiment, the adapter 108 is formed of a transparent material to increase a visibility via the endoscopic vision system.

Figure 4:
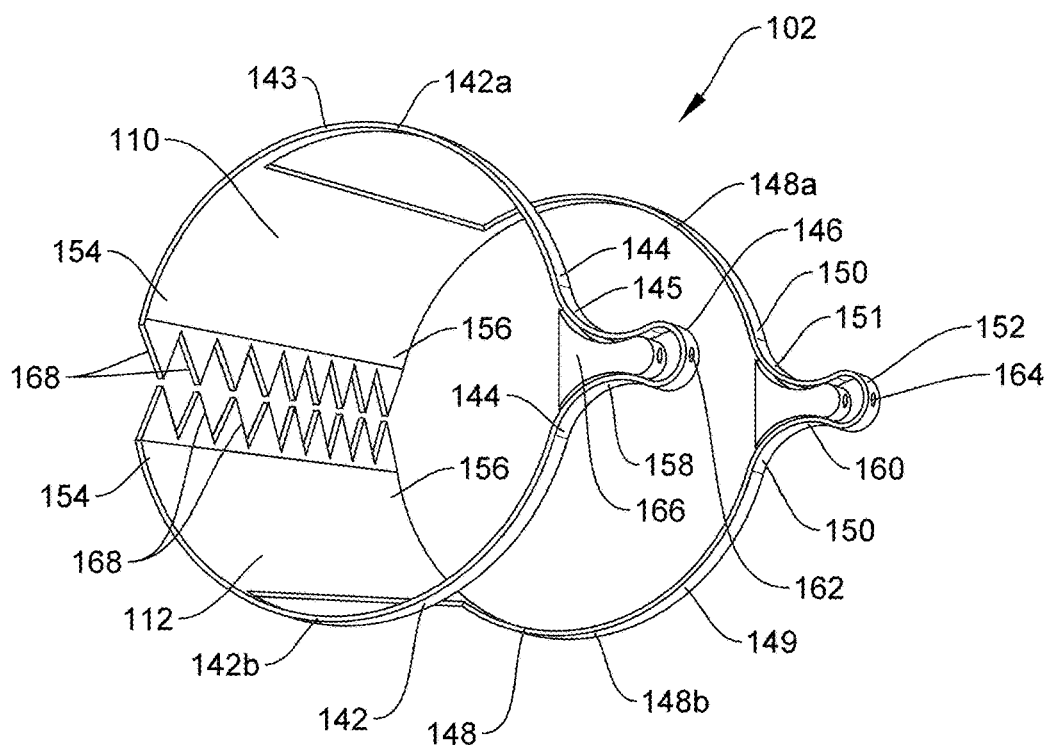
FIG. 4 shows a perspective view of a clip according to the exemplary clipping system of FIG. 1, in a biased closed configuration.
Figure 5:
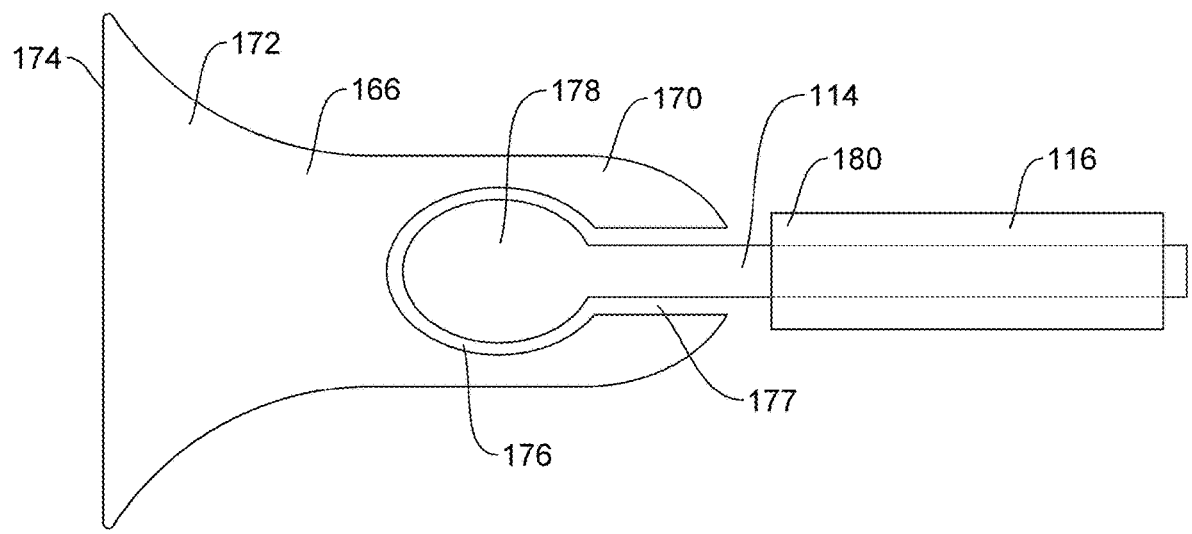
FIG. 5 shows a side view of a yoke and pull wire according to the exemplary clipping system of FIG. 1.

As shown in FIG. 4, the clip 102 includes the first pair of arms 142, proximal ends 144 of which are connected to one another via a first hinge 146, and the second pair of arms 148, proximal ends 150 of which are connected to one another via a second hinge 152. The first jaw 110 extends between a distal end 154 of a first one of the first pair of arms 142 and a distal end 156 of a first one of the second pair of arms 148 while the second jaw 112 extends between the distal end 154 of a second one of the first pair of arms 142 and the distal end 156 of a second one of the second pair of arms 148. Thus, the first and second jaws 110, 112 are movable between the open configuration, in which the first and second jaws 110, 112 are separated from one another, and the closed configuration, in which the first and second jaws 110, 112 are moved toward one another, via a function of the first and second hinges 146, 152.

In an exemplary embodiment, each of the first and second hinges 146, 152 is spring biased so that the first and second jaws 110, 112 are biased toward the closed configuration. However, when the clip 102 is mounted over the adapter 108 in the insertion configuration, the first and second jaws 110, 112 are stretched over opposing portions of the distal portion 122 of the adapter 108 so that an exterior surface thereof maintains the clip 102 open with the first and second jaws 110, 112 separated from one another so that target tissue may be received therebetween. When the clip 102 is moved distally off the adapter 108, the clip 102 is freed to close under the natural bias of the first and second hinges 146, 152. It will be understood by those of skill in the art that portions of the clip 102 and, in particular the first and second hinges 146, 152, are sufficiently biased toward the closed configuration to maintain the clip 102 in position clipped over target tissue after the clip has been finally deployed. In one example, portions of the clip 102 (e.g., the first and second hinges 146, 152) are formed of a shape memory alloy such as, for example, Nitinol to provide and/or add to the bias toward the closed configuration.

Each of the first pair of arms 142 extends from the proximal end 144 to the distal end 154. The proximal ends 144 of the first pair of arms 142 are connected to one another via the first hinge 146 so that the distal ends 154 of the first pair of arms 142 are movable between the open configuration, in which the distal ends 154 are separated from one another, and the closed configuration, in which the distal ends 154 are moved toward one another. The first hinge 146 is configured such that the first pair of arms 142 is biased toward the closed configuration. In an exemplary embodiment, the first pair of arms 142 is formed of a single piece of material 143 configured in an open ring shape. In other words, an opening extends between the distal ends 154 of the first pair of arms 142 while each of the first and second arms 142a, 142b thereof is curved in a semi-circular shape.

The first hinge 146, which connects the proximal ends 144 of the first and second arms 142a, 142b may be formed via a bending of the single piece of material 143 such that the first hinge 146 is formed via a rounded portion of the single piece of material 143. The first hinge 146 includes an opening 162 extending therethrough, the opening sized, shaped, and configured to receive a portion of a corresponding one of the pull wires 114 therein. In an exemplary embodiment, this rounded first hinge 146 is connected to the first and second arms 142a, 142b of the first pair of arms 142 via a waisted portion 158 in which a spacing between opposing portions of the single piece of material 143 there along is smaller than a diameter of the first hinge 146. In one example, the waisted portion 158 is defined via inwardly curved portions of the single piece of material 143. In another example, the waisted portion 158 is formed via inwardly angled portions of the single piece of material 143. Thus, a hourglass portion 145 of the single piece of material 143 extending along the proximal ends 144 of the first and second arms 142a, 142b, the waisted portion 158 and the first hinge 146 has a substantially hourglass shape.

Similarly, each of the second pair of arms 148 extends from the proximal end 150 to the distal end 156. The proximal ends 150 of the second pairs of arms 148 are connected to one another via the second hinge 152 so that the distal ends 156 of the second pair of arms 148 are movable between the open configuration, in which the distal ends 156 are separated from one another, and the closed configuration, in which the distal ends 156 are moved toward one another. The second hinge 152 is configured such that the second pair of arms 148 are biased toward the closed configuration. In an exemplary embodiment, the second pair of arms 148 are formed of a single piece of material 149 configured in an open ring shape. In other words, the opening extends between the distal ends 156, while each of the first and second arms 148a, 148b of the second pair of arms 148 is curved in a semi-circular shape.

In an exemplary embodiment, the second hinge 152, which connects the proximal ends 150 of the first and second arms 148a, 148b are formed via bending of the single piece of material 149 such that the second hinge 152 is formed via a rounded portion of the single piece of material 149. The second hinge 152 includes an opening 164 extending therethrough. The opening 164 is sized, shaped, and configured to receive a portion of a corresponding one of the pull wires 114 therein. In an exemplary embodiment, this rounded second hinge 152 is connected to the first and second arms 148a, 148b via a waisted portion 160 in which a distance between opposing portions of the single piece of material 149 there along is smaller than a diameter of the rounded second hinge 152. In one example, the waisted portion 160 is defined via inwardly curved portions of the single piece of material 149. In another example the waisted portion 160 is defined via inwardly bent (i.e., angled) portions of the single piece of material 149. Thus, a hourglass portion 151 of the single piece of material 149 extending along the proximal ends 150 of the first and second arms 148a, 148b of the second pair of arms 148, the waisted portion 160 and the second hinge 152 has a substantially hourglass shape.

As described above, the first jaw 110 extends between the distal end 154 of the first one 142a of the first pair of arms 142 and the distal end 156 of the first one 148a of the second pair of arms 148, while the second jaw 112 extends between the distal end 154 of the second arm 142b of the first pair of arms 142 and the distal end 156 of the second arm 148b of the second pair of arms 148. Each of the first and second jaws 110, 112 of this embodiment is curved so that, when the clip 102 is mounted over the distal portion 122 of the adapter 108 in the open configuration, the first and second jaws 110, 112 correspond in shape to an exterior of the distal portion 122. In an exemplary embodiment, each of the first and second jaws 110, 112 includes gripping features such as, for example, teeth 168 for gripping tissue therebetween. For example, teeth 168 of the first jaw 110 extend toward the second jaw 112 while the teeth 168 of the second jaw 112 extend toward the first jaw 110.

Figure 8:
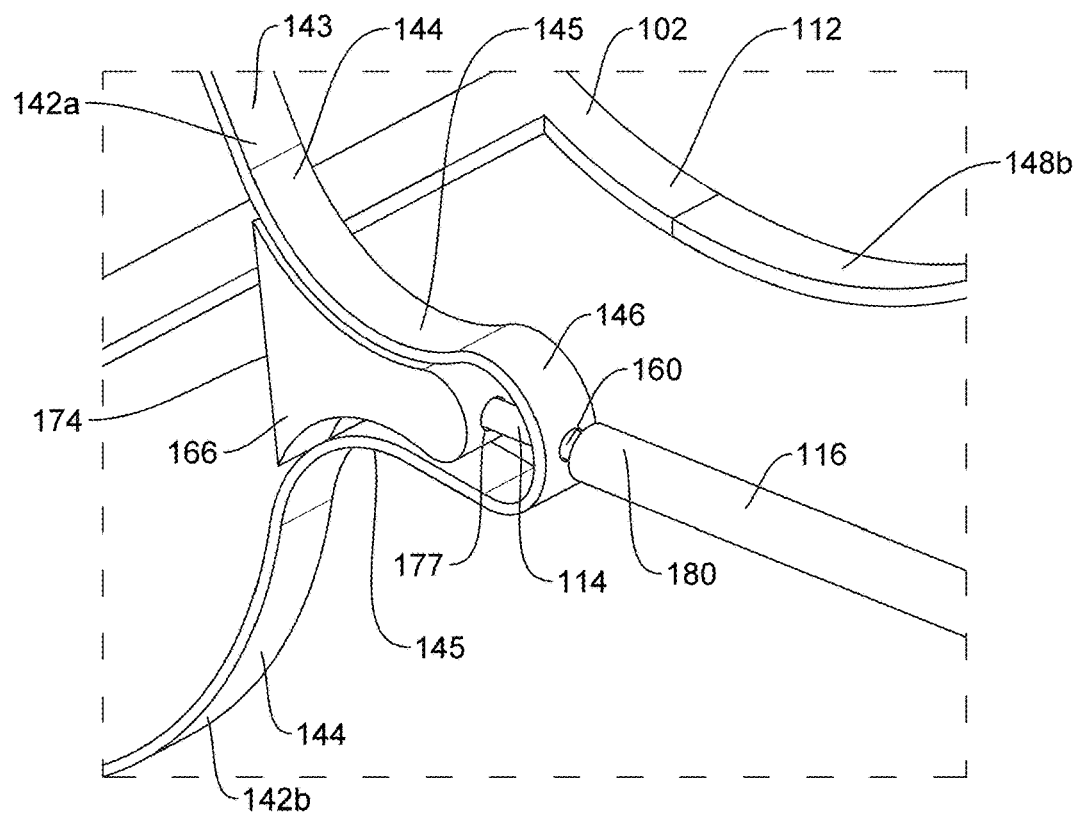
FIG. 8 shows a perspective view of a portion of the exemplary clipping system of FIG. 1, during a deployment of the clip.

Each of the hourglass portions 145, 151 of the first and second pairs of arms 142, 148 is configured to receive a correspondingly sized and shaped yoke 166 therein. In an exemplary embodiment, as shown in FIG. 4, each yoke 166 has a rounded proximal portion 170 and a distal portion 172 which flares toward a distal end 174 thereof, the proximal portion 170 and the distal portion 172 connected to one another via a waisted portion. The yoke 166 of this embodiment corresponds in size and shape to the hourglass portions 145, 151 so that the proximal portion 170 is received within a corresponding one of the first and second hinges 146, 152 (as shown in FIGS. 1, 2, and 8) and is held therein via the hourglass portions 145, 151.

As will be understood by those of skill in the art, however, although the proximal portions 170 of the yokes 166 are held within the first and second hinges 146, 152, longitudinal movement of the yokes 166 relative to the first and second pair of arms 142, 148 aids in moving the clip 102 between the open and the closed configurations, reducing stress on the first and second hinges 146, 152. In particular, as the yokes 166 are moved distally relative to the first and second of pairs of arms 142, 148, the rounded proximal portions 170 of the yokes 166 engage and/or slide along a proximal portion of the inwardly angled/curved waisted portions 158, 160 so that distal ends 154, 156 of the first and second pairs of arms 142, 148 are moved away from one another toward the closed configuration. As the yokes 166 are moved proximally relative to the first and second pairs of arms 142, 148, the flared distal portions 172 engage and/or slide along a distal portion of the inwardly curved/angled waisted portions 158, 160 so that the first pair of arms 142 and the second pair of arms 148 are moved toward the open configuration.

The rounded proximal portion 170 of each of yoke 166 of this embodiment includes a cavity 176 formed therein. The cavity 176 is sized, shaped and configured to receive an enlarged distal end 178 (e.g., ball-shaped) of a corresponding one of the pull wires 114 therein. In particular, the enlarged end 178 of the pull wire 114 is received in the cavity 176 so that a remaining length of the pull wire 114 extends through a proximal opening 177 of the cavity 176, through a corresponding one of the openings 162, 164 of the first and second hinges 146, 152, to a proximal end accessible to a user at a proximal end of the system 100.

Figure 6:
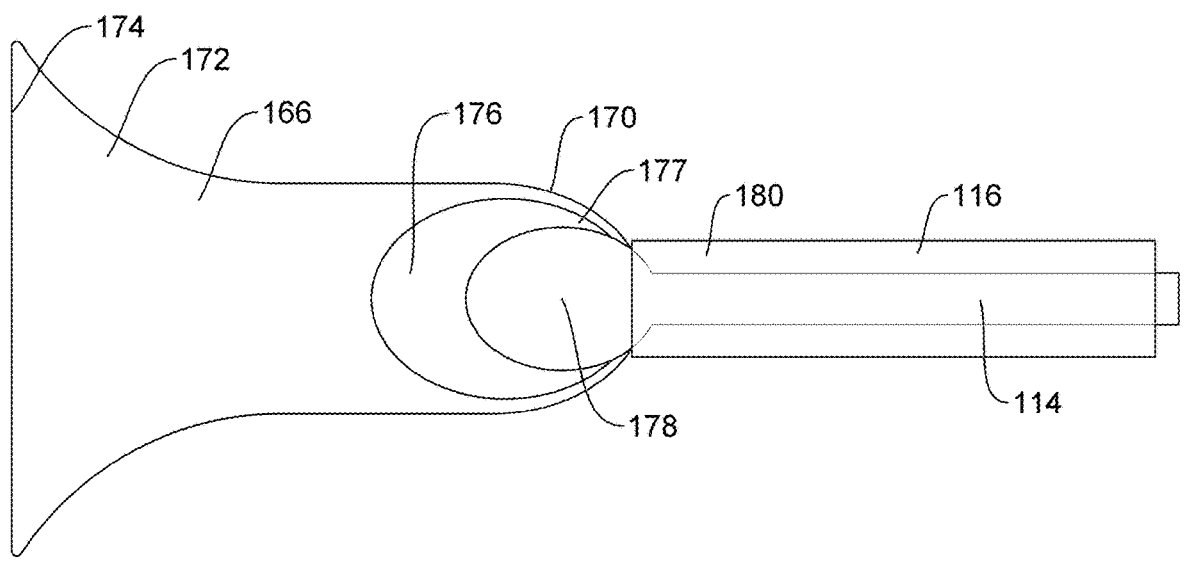
FIG. 6 shows a side view of the yoke and pull wire according to the exemplary clipping system of FIG. 1, during a release of the pull wire from the yoke.
Figure 7:
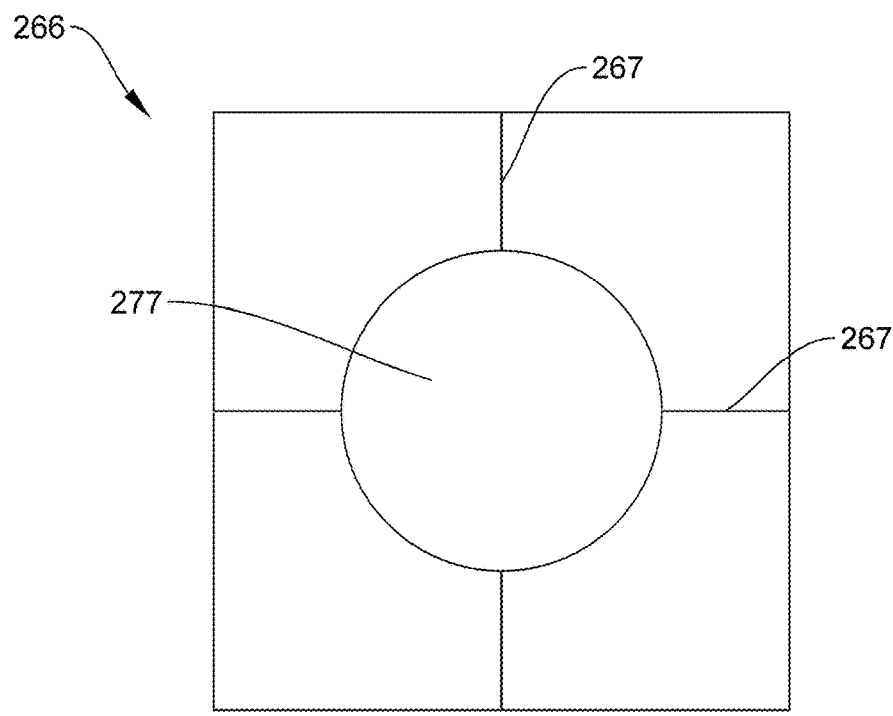
FIG. 7 shows a plan view of a proximal opening of a yoke according to a further exemplary embodiment of the present disclosure.

In an exemplary embodiment, the yoke 166 is formed of a material such that, when a force exceeding a predetermined threshold force is exerted thereon via the enlarged end 178, as will be described in further detail below, the proximal opening 177 deforms, as shown in FIG. 6, to permit the enlarged end 178 to pass proximally therethrough during the final deployment of the clip 102. In an exemplary embodiment, the yoke 166 is formed of a thermoplastic material such as, for example, ABS, or a metal material having memory effect such as, for example, Nitinol. In a further exemplary embodiment, as shown in FIG. 7, a proximal opening 277 into a cavity 276 of a yoke 266 includes one or more slits 267 extending thereabout so that, when a force exceeding a predetermined threshold force is exerted thereon, the one or more slits 267 breaks, increasing a size of the proximal opening 277 and allowing an enlarged end of a pull wire to pass proximally therethrough.

As described above, movement of the clip 102 between the insertion position (i.e., open configuration), the initial deployed position (i.e., closed configuration), and the review position (e.g., clip closed with the scope device and adapter 108 spaced proximally from the clip 102) is achieved via the pull wires 114. The pull wires 114 extend from the enlarged end 178 releasably coupled to the clip 102 via the yoke 166 to a proximal end (not shown) coupled to the user interface 188. Each pull wire 114 extends through a tubular deployment member 116, which also extends along a length of the shaft 118 of the scope device 104 so that the pull wire 114 is longitudinally slidable within the tubular deployment member 116. Each tubular deployment member 116 extends from a distal end 180 positioned proximally of a corresponding one of the first and second hinges 146, 152 to a proximal end accessible and connected to the user interface 188. In an exemplary embodiment, the tubular deployment members 116 is formed of, for example, flexible strands, filaments, or coils formed of, for example, a metal or polymer, as would be understood by those of skill in the art.

While the pull wires 114 are slidably received within the tubular deployment members 116, the tubular deployment members 116 are slidably received within outer sheaths 132. In an exemplary embodiment, each outer sheath 132 extends from a distal end 182 received within and connected to a corresponding one of the openings 130 in the flange 128 of the adapter 108 to a proximal end 184 fixedly attached to the handle member 190. In an exemplary embodiment, the outer sheaths 132 extend along diametrically opposing portions of the shaft 118, in alignment with the end surfaces 135 of the distal portion 122 of the adapter 108, as shown in FIGS. 1-2, so that the first and second pairs of arms 142, 148, to which the pull wires 114 are releasably connected, may extend and move along the ends surfaces 135 as the clip 102 is moved between the open and closed configurations.

The outer sheaths 132 of an exemplary embodiment are fixed with respect to the shaft 118 so that when the pull wires 114 are longitudinally translated relative to the outer sheaths 132, the pull wires 114 move the clip 102 relative to the scope device 104 between the insertion, initial deployed, and review positions. In particular, as a tension along the pull wires 114 is released, the natural bias of the clip 102 moves the clip 102 from the insertion position toward the initial deployed position as the first and second jaws 110, 112 slide distally along the distal portion 122 of the adapter 108 from the open configuration toward the closed configuration. Thus, as the clip 102 is moved from the insertion configuration toward the initial deployed configuration, the first and second jaws 110, 112 grip tissue that has been received within the channel 140 of the adapter 108.

Once the clip 102 is in this initial deployed configuration, the scope device 104 may be drawn proximally relative to the clip 102, while the clip 102 remains tethered thereto via the pull wires 114, to the review configuration in which a distance between the clip 102 and the distal end 106 of the scope device 104 is increased so that the clip 102 is more easily viewable via the optical system of the scope device 104. If, upon review, it is desired to adjust a position/placement of the clip 102, the pull wires 114 are drawn proximally with respect to the outer sheaths 132 and the scope device is moved distally until the clip 102 is drawn into contact with the adapter 108. The pull wires 114 are then drawn further proximally to pull the clip 102 over the adapter 108 so that the first and second jaws 110, 112 are pulled apart from one another as they move over the curved surfaces of the distal portion 122 of the adapter 108 until the clip 102 returns to the open configuration.

While the clip 102 is moved from the closed configuration toward the open configuration by drawing the clip 102 proximally over the adapter 108, as described above, the flared distal portions 172 of the yokes 166 also engage the waisted portions 158, 160 of the first and second pairs of arms 142, 148 to aid in moving the clip 102 from the closed configuration toward the open configuration, thereby reducing stress on the first and second hinges 146, 152. The scope device 104 and the clip 102 may then be repositioned relative to a target tissue so that the clip 102 may be moved, once again, to the initial deployed position and then to the review position, as described above, to confirm whether the clip 102 has been clipped in a desired position over the target tissue.

Figure 9:
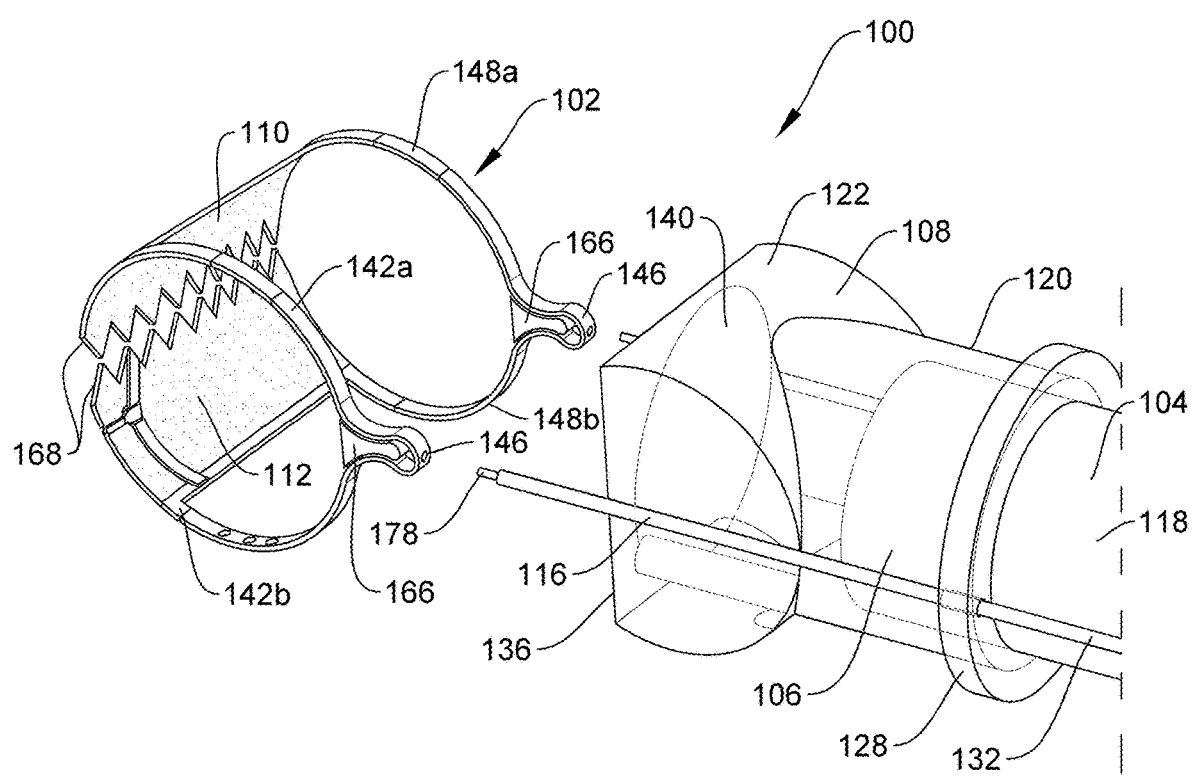
FIG. 9 shows a perspective view of a distal portion of the exemplary clipping system of FIG. 1, with the clip finally deployed therefrom.

According to one embodiment, when it is desired to release the clip 102 from the scope device 104 (i.e., to move the clip 102 to a final deployed configuration), the tubular deployment members 116 are moved distally with respect to the scope device 104 until the distal ends 180 are positioned against the first and second hinges 146, 152, as shown in FIG. 8. Holding the tubular deployment members 116 against the clip 102, the pull wires 114 are drawn proximally relative to the tubular deployment members 116 (and the clip 102) until a force exerted thereon exceeds the predetermined threshold force, causing the proximal openings 177 of the yokes 166 to deform and allow the enlarged ends 178 of the pull wires 114 to be pulled proximally out of the yokes 166. As the enlarged ends 178 are released from the yokes 166, the enlarged ends 178 are drawn proximally through the openings 162, 164 of the first and second hinges 146, 152, respectively, releasing the clip 102 from the pull wires 114 to finally deploy the clip 102, as shown in FIG. 9.

Figure 10:
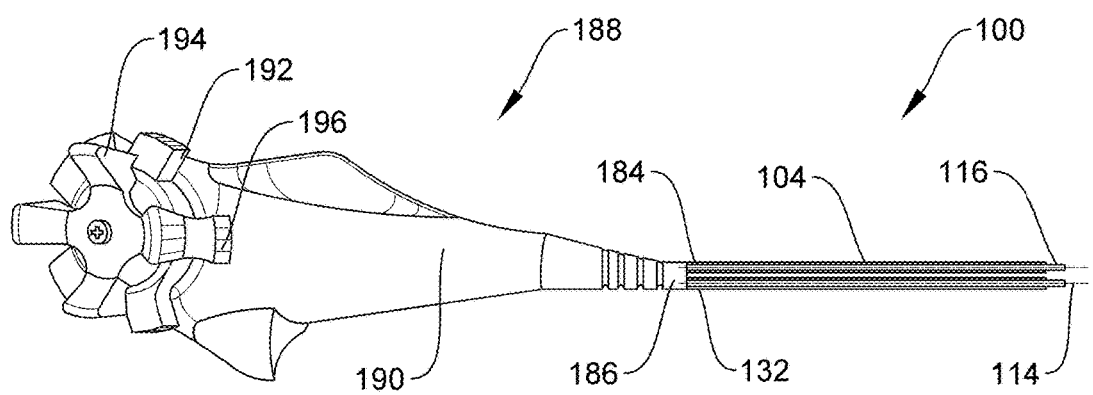
FIG. 10 shows a side view of a user interface according to the exemplary clipping system of FIG. 1.

The user interface 188 is configured to permit the user to actuate movement of the clip 102 between the insertion, initial deployed, review, and final deployed positions as would be understood by those skilled in the art. As shown in FIG. 10, the user interface 188 incudes the handle member 190, which is connected to the proximal end 186 of the shaft 118 of the scope device 104, along with a first actuator 192 configured to move the tubular deployment members 116 relative to the outer sheaths 132 and the shaft 118 and a second actuator 194 configured to move the pull wires 114 relative to the outer sheaths 132 and the shaft 118 of the scope device 104. As described above proximal ends 184 of the outer sheaths 132 are fixedly attached to the handle member 190 so that a movement of each of the first and second actuators 192, 194 relative to the handle member 190 moves the tubular deployment members 116 and the pull wires 114, respectively, relative thereto.

In an exemplary embodiment, the first actuator 192 is configured as a spool that is rotatable relative to the handle member 190 to move the tubular deployment members 116 relative to the outer sheaths 132. In particular, proximal ends of the tubular deployment members 116 are connected to the spool of the first actuator 192 so that when the spool is rotated relative to the handle member 190, the tubular deployment members 116 are moved relative to the outer sheaths 132. Rotation of the first actuator 192 in a first direction moves the tubular deployment members 116 distally relative to the outer sheaths 132 and the scope device 104 while rotation of the first actuator 192 in a second direction moves the tubular deployment members 116 proximally relative to the outer sheaths 132.

The first actuator 192 additionally includes a locking mechanism which, in an exemplary embodiment is configured as a locking lever 196. When the locking lever 196 is moved to a locked configuration, the tubular deployment members 116 are locked in a desired position relative to the outer sheaths 132. For example, during a final deployment of the clip 102, the tubular deployment members 116 may be locked in a position in which the distal ends 180 thereof are positioned against the first and second hinges 146, 152. Thus, the tubular deployment members 116 hold the clip 102 as the pull wires 114 are drawn proximally relative thereto to release the pull wires 114 from the yokes 166 and the clip 102.

In an exemplary embodiment, the second actuator 194 is similarly configured as a spool that is rotatable relative to the handle member 190. Proximal ends of the pull wires 114 are connected to the spool so that rotation of the spool of the second actuator 194 moves the pull wires 114 longitudinally relative to the outer sheaths 132. In particular, rotation of the second actuator 194 in a first direction relative to the handle member 190 moves the pull wires distally relative to the outer sheaths 132 and the scope device 104 while rotation of the second actuator 194 in a second direction relative to the handle member 190 moves the pull wires proximally relative to the outer sheaths 132 and the scope device 104.

According to an exemplary method for tissue closure utilizing the system 100, the clip 102 may be inserted to a target site through a body lumen such as, for example, the GI tract, via the scope device 104. As described above, the clip 102 is mounted over the adapter 108, which is positioned over the distal end 106 of the scope device 104, in the insertion position. In the insertion position, the first and second jaws 110, 112 extend over portions of the adapter 108 so that the first and second jaws 110, 112 are separated from one another in the open configuration. The clip 102 is guided to the target site via the scope device 104, in the insertion position, and positioned over a selected portion of target tissue.

Once at the target site, a user selected portion of tissue is drawn into the channel 140 of the adapter 108 via tissue graspers inserted through a working channel of the scope device 104 and/or via a suction force applied therethrough. The clip 102 is then moved toward the initial deployed position by releasing a tension along the pull wires 114 via the second actuator 194 permitting the first and second pairs of arms 142, 148 to revert to their biased closed configuration in which the first and second jaws 110, 112 move toward one another as they move distally off of the adapter 108 to close over the selected portion of tissue in the initial deployed position. Thus, the tissue received within the channel of the adapter 108 is gripped between the first and second jaws 110, 112.

After the user has clipped tissue between the first and second jaws 110. 112 in the initial deployed configuration, the clip 102 is moved to the review configuration by drawing the scope device 104 proximally relative to the clip 102 to increase a distance between the clip 102 and the distal end 106 of the scope device 104. This widens the user's field of view and enhances the observation of the placement of the clip 102 relative to the target tissue. As described above, in the review position, the clip 102 remains tethered to the scope device 104 via the pull wires 114 so that, if it is determined that the clip 102 requires an adjustment and/or repositioning, the scope device 104 may be moved distally toward the clip 102 and the clip 102 may be drawn proximally over the adapter 108 via the pull wires 114, back toward the open configuration.

The yokes 166 aid in opening of the clip 102 as it is drawn back toward the insertion configuration to reduce stress on the first and second hinges 146, 152. The system 100 and the clip 102 are then repositioned adjacent to a new portion of target tissue and the clip 102 once again moved to the initial deployed position to clip this newly acquired portion of tissue. The user then moves the system 100 to the review position to observe the positioning of the clip 102 relative to the desired clipping location. This process may be repeated, as necessary, until the user visually confirms that the clip 102 has been clipped over the target tissue, as desired.

Once the user confirms that the target tissue has been clipped, as desired, the clip 102 is moved from the review configuration to the final deployed configuration, as shown in FIG. 9, in which the clip 102 is released from the extending members pull wires 114. As described above, to release the clip 102, the tubular deployment members 116 are moved distally relative to the scope device 104 (e.g., via the first actuator 192) until distal ends 180 thereof abut the first and second hinges 146, 152 of the clip 102. Once in position against the clip 102, the locking lever 196 may be used to lock the tubular deployment members 116 relative to the scope device 104 so that the pull wires 114 may be drawn proximally relative to the tubular deployment members 116 and the clip 102 until a force exerted thereon exceeds the predetermined threshold force to release the enlarged ends 178 of the pull wires 114 from the yokes 166.

In an exemplary embodiment, in moving to final deployment, the proximal openings 177 of the yokes 166 are deformed to release the enlarged ends 178—i.e., the enlarged ends 178 are permitted to pass proximally through the openings 162, 164 of the first and second hinges 146, 152, respectively, disengaging the clip 102 from the rest of the system 100 and the scope device 104 so that the finally deployed clip 102 may be left in place clipped over the target tissue as the scope device 104 and the rest of the system 100 are removed from the body. It will be understood by those of skill in the art that the openings 162, 164 are sized and shaped to permit passage the enlarged ends 178 of the pull wires 114 therethrough while also preventing the distal passage of the distal ends 180 of the tubular deployment members 116 therethrough. Thus, upon release of the clip 102, the scope device 104 and the pull wires 114 may be withdrawn from the body so that just the clip 102 remains clipped over the target tissue.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A clipping system for treating tissue, comprising:
an adapter including a proximal portion and a distal portion, the proximal portion extending along a first longitudinal axis and configured to be mounted over a distal end of an insertion device so that the first longitudinal axis is in alignment with a longitudinal axis of the insertion device, the distal portion including a longitudinally truncated cylinder extending along a second longitudinal axis that extends substantially perpendicular relative to the first longitudinal axis; and
a clip including a first pair of arms, proximal ends of which are connected to one another via a first hinge, and a second pair of arms, proximal ends of which are connected to one another via a second hinge, a first jaw extends between distal ends of a first one of the first pair of arms and a first one of the second pair of arms, while a second jaw extends between distal ends of a second one of the first pair of arms and a second one of the second pair of arms so that the first and second jaws are movable relative to one another between an open configuration, in which the first and second jaws are mounted over the distal portion of the adapter such that the first and second jaws separated from one another, and a closed configuration, in which the first and second jaws are moved off of the adapter so that the first and second jaws are moved toward one another.

2. The system of claim 1, wherein each of the first and second pairs of arms are formed of a single piece of material bent so that the first and second pairs of arms form an open ring shape with the first and second hinges at proximal ends thereof, the first and second hinges biasing the clip toward the closed configuration.

3. The system of claim 2, wherein each of the first and second hinges are connected to the proximal ends of a corresponding one of the first and second pairs of arms via a waisted portion formed via inwardly bent portions of the single piece of material.

4. The system of claim 1, wherein each of the first and second hinges includes a yoke received therein, the yoke configured to releasably engage a pull wire for moving the clip between the open configuration and the closed configuration.

5. The system of claim 4, wherein each of the yokes include includes a proximal portion including a cavity configured to releasably receive an enlarged end of the pull wire, a proximal opening of the cavity configured to deform when subject to a force exceeding a predetermined threshold force to allow the enlarged end of the pull wire to be released therefrom.

6. The system of claim 5, wherein the proximal opening includes at least one slit extending thereabout, the at least one slit configured to break and increase a size of the proximal opening when subject to a force exceeding the predetermined threshold force to allow the enlarged end of the pull wire to be released therefrom.

7. The system of claim 4, wherein each of the yokes includes a flared distal portion sized, shaped and configured to interface with the proximal ends of a corresponding one of the first and second pairs of arms to aid in moving the clip from the closed configuration toward the open configuration so as to reduce a stress on the first and second hinges.

8. The system of claim 1, wherein a proximal end of the proximal portion of the adapter includes a flange with a pair of openings extending therethrough, the pair of openings in alignment with planar ends of the truncated cylinder of the distal portion and configured to slidably receive pull wires therethrough so that the first and second pairs of arms slide along the planar ends to move the clip relative to adapter between the open and closed configurations.

9. A clipping system for treating tissue, comprising:
an endoscope including a shaft extending longitudinally from a proximal end to a distal end;
an adapter including a proximal portion mounted over the distal end of the shaft such that a first longitudinal axis along which the proximal portion extends is coaxially aligned with a longitudinal axis of the shaft, and a distal portion including a longitudinally truncated cylinder extending along a second longitudinal axis substantially perpendicular to the first longitudinal axis, a channel extending through the proximal and distal portions along the first longitudinal axis;
a clip including a first pair of arms, proximal ends of which are connected to one another via a first hinge, and a second pair of arms, proximal ends of which are connected to one another via a second hinge, a first jaw extends between distal ends of a first one of the first pair of arms and a first one of the second pair of arms, while a second jaw extends between distal ends of a second one of the first pair of arms and a second one of the second pair of arms so that the first and second jaws are movable relative to one another between an open configuration, in which the first and second jaws are mounted over the distal portion of the adapter such that the first and second jaws separated from one another, and a closed configuration, in which the first and second jaws are moved off of the adapter so that the first and second jaws are moved toward one another; and
first and second pull wires connected to the first and second hinges, respectively, via yokes received within the first and second hinges, the first and second pull wires releasably coupled to the yokes and longitudinally slidable relative to the endoscope to move the clip between the open configuration, an initial deployed configuration, in which the clip is in the closed configuration immediately distal of the adapter, and a review configuration, in which the clip is moved distally away from the distal end of the endoscope while remaining tethered to the endoscope via the first and second pull wires.

10. The system of claim 9, wherein each of the first and second pairs of arms are formed of a single piece of material bent so that the first and second pairs of arms form an open ring shape with the first and second hinges at proximal ends thereof, the first and second hinges biasing the clip toward the closed configuration.

11. The system of claim 10, wherein each of the first and second hinges are connected to the proximal ends of a corresponding one of the first and second pairs of arms via a waisted portion formed via inwardly bent portions of the single piece of material.

12. The system of claim 9, wherein each of the yokes includes a proximal portion sized and shaped to be received within a corresponding one of the first and second hinges and a distal portion that is sized, shaped and configured to interface with proximal ends of a corresponding one of the first and second pairs of arms.

13. The system of claim 12, wherein the distal portions of the yokes are flared so that, when the yokes are moved proximally relative to the clip, the flared distal portions slide proximally along the proximal ends of the first and second pairs of arms to facilitate movement of the clip from the closed configuration toward the open configuration.

14. The system of claim 12, wherein each of the first and second pull wires include an enlarged distal end releasably received within a correspondingly sized and shaped cavity within the proximal portion of a corresponding one of the yokes, a proximal opening of the cavity configured to deform to permit a proximal passage of the enlarged distal end therethrough when subject to a force exceeding a predetermined threshold force.

15. The system of claim 14, further comprising:
first and second tubular deployment members configured to slidably receive the first and second pull wires therein,
wherein each of the first and second tubular deployment members is longitudinally movable relative to the endoscope so that, during a final deployment of the clip, distal ends of the first and second tubular deployment members are positionable against the first and second hinges, respectively, to hold the clip in place as the first and second pull wires are drawn proximally relative thereto to exert the predetermined threshold force on the yokes.

16. A method for treating tissue, comprising:
inserting a clip to a target area in a body lumen via an endoscope, the clip mounted over a distal end of an endoscopic shaft, via an adapter, in an open insertion configuration in which first and second jaws of the clip extend over curved surfaces of a distal portion of the adapter so that that the first and second jaws are separated from one another, the adapter including a proximal portion mounted over the distal end of the shaft such that a first longitudinal axis along which the proximal portion extends is coaxially aligned with a longitudinal axis of the shaft, the distal portion including a longitudinally truncated cylinder extending along a second longitudinal axis substantially perpendicular to the first longitudinal axis;
applying a suction force through a working channel of the endoscope so that tissue is drawn into a channel of the adapter, which extends along the first longitudinal axis, and between the first and second jaws of the clip; and
moving the clip from the open insertion configuration to an initial deployed configuration by releasing a tension along pull wires that are releasably coupled to the clip, the clip including a first pair of arms, proximal ends of which are connected to one another via a first hinge, and a second pair of arms, proximal ends of which are connected to one another via a second hinge, the first jaw extending between distal ends of a first one of the first pair of arms and a first one of the second pair of arms, while the second jaw extends between distal ends of a second one of the first pair of arms and a second one of the second pair of arms so that the first and second jaws are movable relative to one another between the open insertion configuration and the initial deployed configuration in which the clip is moved distally off of the distal portion of the adapter so that the first and second jaws revert toward a biased closed configuration to grip tissue therebetween.

17. The method of claim 16, further comprising:
moving the clip toward a review configuration in which the endoscope is drawn proximally away from the clip to widen a field of vision of the clip via a vision system of the endoscope, while the clip remains tethered to the endoscope via the pull wires.

18. The method of claim 17, wherein the pull wires are connected to the first and second hinges, respectively, via yokes received within the first and second hinges, the pull wires releasably coupled to the yokes and longitudinally slidable relative to the endoscope to move the clip between the open insertion configuration, the initial deployed configuration, and the review configuration.

19. The method of claim 18, wherein, when it is determined that the clip requires repositioning, moving the endoscope distally relative to the clip and drawing the pull wires proximally relative to the endoscope so that the flared distal portions of the yoke interface with proximal ends of the first and second pairs of arms to aid in moving the clip from the biased closed configuration toward the open insertion configuration as the clip is draw proximally over the distal portion of the adapter to reduce a stress on the first and second hinges.

20. The method of claim 18, further comprising:
finally deploying a closed clip by sliding tubular deployment members distally over the pull wires until distal ends of the tubular deployment members are positioned against the first and second hinges to hold the clip in place as the pull wires are drawn proximally relative thereto to exert a predetermined threshold force on the yokes, causing the pull wires to be disengaged from the yokes and the clip.

* * * * *